United States Patent [19]

Vakili

[11] 4,332,983
[45] Jun. 1, 1982

[54] TELEPHONE PRIVACY CONTROLLER

[76] Inventor: Hosein Vakili, 273 Marchmont Dr., Los Gatos, Calif. 95030

[21] Appl. No.: 200,934

[22] Filed: Oct. 27, 1980

[51] Int. Cl.³ .............................................. H04M 1/70
[52] U.S. Cl. .................................... 179/17 B; 179/38
[58] Field of Search ................ 179/17 B, 30, 38, 99 E

[56] References Cited
U.S. PATENT DOCUMENTS 3,499,121  3/1970  McIntosh et al. ................ 179/17 B
4,039,759  8/1977  Taylor .................................... 179/38

FOREIGN PATENT DOCUMENTS 9293  2/1980  European Pat. Off. .......... 179/17 B
54-14104  2/1979  Japan .................................. 179/99 E
1078795  8/1967  United Kingdom .............. 179/17 B Primary Examiner—Gerald L. Brigance
Attorney, Agent, or Firm—Thomas E. Schatzel

[57] ABSTRACT

A telephone privacy controller for connection in series with a telephone set having steering diodes that direct current through a silicon controlled rectifier which is activated to conduct current by a zener diode connected between the current input and the gate input of the silicon controlled rectifier. The telephone privacy controller may be adapted to include a privacy release feature by addition of a capacitor and resistor connected to the gate input of the silicon controlled rectifier wherein the discharge from said capacitor may provide an input to the gate of the silicon controlled rectifier.

1 Claim, 4 Drawing Figures

U.S. Patent
Jun. 1, 1982
4,332,983
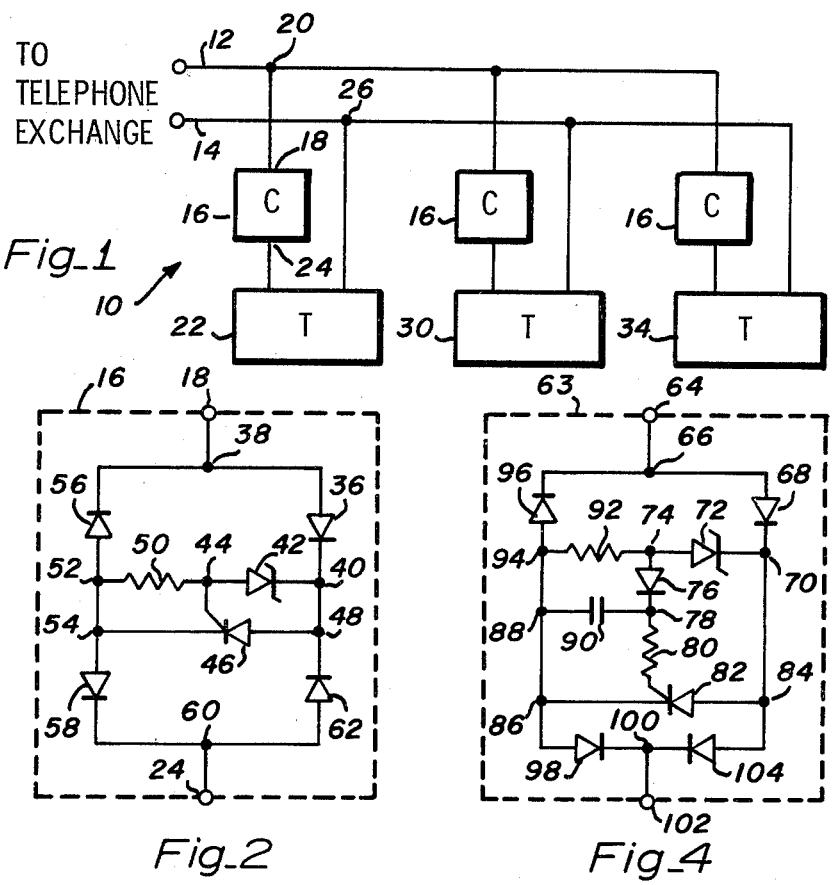
Fig_1
Fig_2
Fig_4
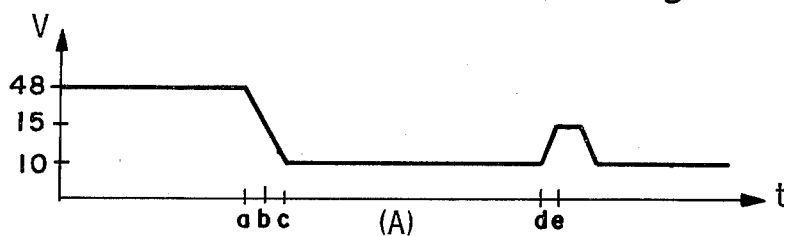
(A)
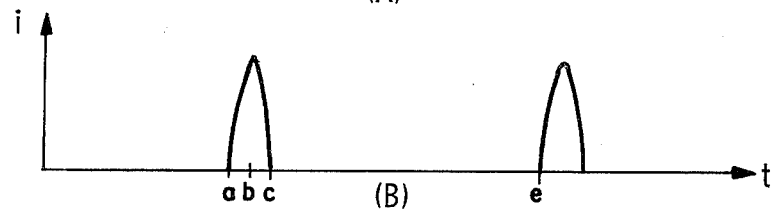
(B)
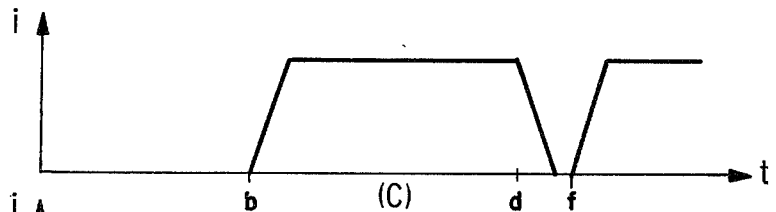
(C)
Fig_3
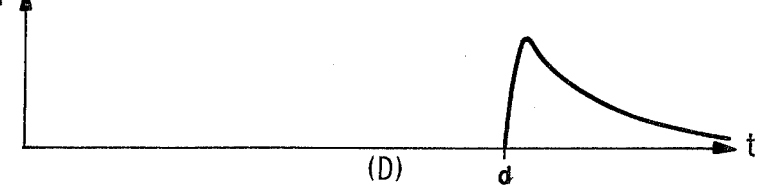
(D)

und 4,332,983

TELEPHONE PRIVACY CONTROLLER

BACKGROUND OF THE INVENTION

1. Field of the Invention

The invention relates generally to telephone privacy controllers and more particularly to a telephone privacy controller wherein only one of several telephones connected to a common telephone line may have access to the telephone line at any given time.

2. Description of the Prior Art

It is a common practice in homes and offices to have numerous telephones connected to a single telephone line. Each telephone line comprises two wires between a home or office and a local telephone exchange. Each telephone set connected to a line is connected in parallel with each other set on the line. Thus, with many systems, when one telephone on the line is being used any of the other telephones on the line may listen in on the conversation. Also, when one telephone on a line is being used, having other telephones connected to the line although not in use creates an additional load on the phone lines.

SUMMARY OF THE INVENTION

It is therefore an object of the present invention to provide a telephone privacy controller capable of limiting access to a telephone line to a single telephone set.

It is a further object to provide a controller that permits release of sole access to a telephone line.

It is a further object to provide a telephone privacy controller which reduces the load on a telephone line.

It is a further object to provide a telephone privacy controller which is economical to make.

It is a further object to provide a telephone privacy controller which does not require a power supply and does not draw current from the telephone line.

Briefly, the present invention includes an electronic circuit adapted for connection in series with each telephone connected to a telephone line. The circuit includes diodes for steering curring through a silicon controlled rectifier and a zener diode for providing a pulse to the gate input of the silicon controlled rectifier when the handset is removed from the cradle of the telephone. An alternative embodiment of the present invention also includes a capacitor and a diode connected to the gate input of the silicon controlled rectifier. The capacitor and diode are adapted to permit release of privacy on a line by momentarily depressing the connecting switch in the cradle of the telephone set.

An advantage of the telephone privacy controller of the present invention is that access to a telephone line may be limited to a single telephone set.

Another advantage of the telephone privacy controller is that private access to a telephone line may be released.

A further advantage of the present invention is that the telephone line does not become overloaded when numerous telephones are connected to the line.

A further advantage is that the telephone privacy controller of the present invention is ecomonical and relatively easy to install.

A further advantage is that the telephone privacy controller of the present invention does not require a power supply and does not draw current from the telephone line.

These and other objects and advantages of the present invention will no doubt become obvious to those of ordinary skill in the art after having read the following detailed description of the preferred embodiments which are illustrated in the various drawing figures.

IN THE DRAWING

FIG. 1 is a block diagram illustrating the connection of the telephone privacy controller of the present invention to a telephone line;

FIG. 2 is a circuit diagram of the telephone privacy controller of the present invention;

FIG. 3 comprises three signal wave form diagrams illustrating the signal wave forms at various nodes in the circuits of FIG. 2 and FIG. 3, and FIG. 4 is a circuit diagram of an alternative embodiment of the telephone privacy controller of the present invention.

DETAILED DESCRIPTION OF THE PREFERRED EMBODIMENT

FIG. 1 illustrates a local telephone system as would exist in a home or office facility and including the telephone privacy controller in accordance with the present invention. The system is referred to by the general reference numeral 10 and includes a telephone line 12 and a telephone line 14. A telephone privacy controller 16 having a terminal 18 is connected to a terminal 20 of the telephone line 12. A telephone set 22 is connected to a terminal 24 of the controller 16 and to a terminal 26 on the line 14. A telephone set 30 is connected in series with another controller 16 to the lines 12 and 14 and a telephone set 34 is also connected in series with another controller 16 to the lines 12 and 14.

FIG. 2 is a circuit diagram of the telephone privacy controller 16. The controller 16 includes a diode 36 having its input connected to a terminal 38 which is connected to the terminal 18. The output of the diode 36 is connected to a terminal 40 connected to the input of a zener diode 42. The output of the zener diode 42 is connected to a terminal 44 which is connected to the gate input of a silicon controlled rectifier (SCR) 46. The terminal 40 is also connected to a terminal 48 which is connected to the input of the SCR 46. A resistor 50 is connected between the terminal 44 and a terminal 52. The output of the SCR 46 is connected to a terminal 54 which is connected to the terminal 52. A diode 56 has its input connected to the terminal 52 and its output connected to the terminal 38. A diode 58 has its input connected to the terminal 54 and its output connected to a terminal 60 which is connected to the terminal 24. A diode 62 has its input connected to the terminal 60 and its output connected to the terminal 48.

The operation of the controller 16 is believed to be as follows. The controller 16 is connected in series with the telephone set 22 and the telephone lines. When the hand set of each telephone connected to the lines 12 and 14 is in the cradle of the telephone set, thus causing the connecting switch to be depressed, the voltage potential across the terminals 20 and 26 will be approximately 48 volts. In some telephone networks the voltage across the telephone lines will be other than 48 volts. While all connecting switches in the cradle of the telephone sets are depressed no current will flow through the telephone sets 22, 30 and 34 or the associated controllers 16. When the handset is removed from the telephone set 22 DC current is permitted to flow through the telephone set 22. The direction of DC current flow between the terminals 18 and 24 of the controller 16 will depend upon the polarity of the voltage between terminals 20 and 26 which will reverse when an outgoing call is completed or when a ring signal is received. However, this will not effect the operation of the controller 16 due to the steering diodes 36, 56, 58 and 62. DC current flowing from terminal 18 towards terminal 24 will be steered through diode 36, through the SCR 46 and through diode 58. Conversely, current flowing from terminal 24 towards terminal 18 will be steered through diode 62, through the SCR 46 and through diode 56.

The SCR 46 will not conduct current until it receives a signal on its gate input. In the preferred embodiment the zener diode 42 has a break down voltage of approximately fifteen volts. Thus, when the handset is removed from the cradle of telephone set 22 the reverse bias of the zener diode 42 will be above fifteen volts causing the zener diode 42 to conduct current. This current will then be fed to the gate input of the SCR 46 permitting current flow through the SCR 46.

When the handset is removed from the cradle of telephone set 22 and DC current flows through the telephone set 22 and controller 16 the voltage potential between terminals 20 and 26 will drop to approximately ten volts as illustrated in FIG. 3(A) by the voltage drop between time (a) and time (c). The current through the zener diode 42 which is fed to the gate input of the SCR 46 is illustrated in FIG. 3(B) by the pulse beginning at time (a). When the reverse bias voltage of the zener diode 42 drops below 15 volts as illustrated at time (b) in FIG. 3(A) the zener diode 42 will stop conducting current. The current flow through the SCR 46 is illustrated in FIG. 3(C). At time (b) a signal is received by the gate input of the SCR 46 and the SCR 46 begins to conduct current.

If, after time (b) the handset of one of the telephone sets 30 or 34 is removed from the cradle, the controller associated with that telephone will not conduct current. This is because the voltage potential across the terminals 20 and 26 is approximately ten volts and thus the zener diode 42 will not conduct current and the gate input of the SCR 46 will not receive any signal to cause the SCR 46 to conduct current.

The telephone privacy controller 16 will not prevent the bells in the associated telephone sets from ringing when there is an incoming call. The ringing of the bell is caused by an AC signal superimposed on the 48 volts DC signal across the telephone lines 12 and 14. The telephone sets 22, 30 and 34 will not block AC current. An AC signal received by the controller 16 will be transmitted by the zener diode 42 since the signal is superimposed on the 48 volt DC signal and therefore will be higher than the 15 volt breakdown voltage of the zener diode 42. The AC signal will be present at the gate input of the SCR 46 causing the SCR 46 to conduct the AC signal.

FIG. 4 illustrates a telephone privacy controller 63 which is an alternative embodiment of the telephone privacy controller 16. The controller 63 includes a terminal 64 connected to a terminal 66. A diode 68 has its input connected to the terminal 66 and its output connected to a terminal 70. A zener diode has its input connected to the terminal 70 and its output connected to a terminal 74. A diode 76 has its input connected to the terminal 74 and its output connected to terminal 78. A resistor 80 is connected to the terminal 78 and to the gate input of a silicon controlled rectifier (SCR) 82. The input of the SCR 82 is connected to a terminal 84 which is connected to the terminal 70. The output of the SCR 82 is connected to a terminal 86 which is connected to a terminal 88. A capacitor 90 is connected between the terminals 78 and 88. A resistor 92 is connected between the terminal 74 and a terminal 94 which is connected to the terminal 88. A diode 96 has its input connected to the terminal 94 and its output connected to the terminal 66. A diode 98 has its input connected to the terminal 86 and its output connected to a terminal 100 which is connected to a terminal 102. A diode 104 has its input connected to the terminal 100 and its output connected to the terminal 84.

The controller 63 of the alternative embodiment provides a capability for releasing private access to a telephone so that two telephones may have access to the line simultaneously. For example, where a first telephone has private access to the phone line, access to the phone line by a second telephone may be accomplished by removing the handset of the second telephone from the cradle and then momentarily depressing the connecting switch of the first telephone. The second telephone will gain access to the telephone line because when the connecting switch of the first telephone is depressed current will stop flowing through the first telephone and its controller 63 and thus the voltage across the phone line will begin to rise as illustrated in FIG. 3(A) at time (d). At time (e) the voltage will reach fifteen volts at which time the zener diode 72 of the controller 63 connected in series with the second telephone will begin to conduct current. The gate input of the SCR 82 will then receive a signal illustrated by the pulse beginning at time (e) of FIG. 3(B).

The capacitor 90 of controller 63 in series with the first telephone is initially charged by the pulse to the gate input of the SCR 82 which occurs when the handset of the first telephone set is removed from the cradle. At time (d) when the connecting switch of the first telephone is depressed the SCR 82 stops conducting current and the capacitor 90 will begin to discharge as illustrated in FIG. 3(D) by the waveform beginning at time (d). The diode 76 will steer the discharge current from capacitor 90 through the resistor 80 to the gate input of the SCR 82. At time (f), illustrated in FIG. 3(C), the connecting switch of the telephone set 30 is released. The current discharge from capacitor 90 will cause the SCR 82 to begin conducting current. Thus both the first and second telephones have access to the telephone line simultaneously.

It is not necessary that all controllers of the local telephone network 10 be alike. However, only those controllers illustrated by the alternative embodiment of FIG. 4 will have the privacy release capability. Also any person with a telephone in the local telephone network 10 which does not have a controller in series with it may listen in on any telephone conversation.

The voltage drop across the controller 16 or 63 will be approximately 1.8 volts where silicon diodes are used. This voltage drop is within limits set by telephone company regulations and will not disrupt the telephone network.

Although the present invention has been described in terms of the presently preferred embodiment, it is to be understood that such disclosure is not to be interpreted as limiting. Various alterations and modification will no doubt become apparent to those skilled in the art after having read the above disclosure. Accordingly, it is intended that the appended claims be interpreted as covering all alterations and modification as fall within the true spirit and scope of the invention.

I claim:
1. A telephone privacy controller for a party line comprising, at each telephone on said party line:
- a first terminal being connected to one of the leads of the party line pair;
- a first steering diode connected to the first terminal;
- a second terminal connected to the first steering diode whereby current may flow from the first terminal to the second terminal;
- a silicon controlled rectifier connected to the second terminal, the third silicon controlled rectifier including a gate input for receiving pulses whereby the silicon controlled rectifier will permit current flow upon receipt of said pulses at said gate;
- a Zener diode with one element connected to the second terminal and one element connected to a second steering diode and a resistive element;
- a third terminal connected to the output of the silicon controlled rectifier;
- capacitive means coupled to said gate of the silicon controlled rectifier and to the third terminal, the capacitive means including a capacitor and a resistor connected in series between said gate input of the silicon controlled rectifier and the output of the silicon controlled rectifier, the common junction of said resistor and capacitor being common to said second diode;
- a third steering diode connected to the third terminal and to the first terminal whereby current may flow from the third terminal to the first terminal;
- a fourth steering diode connected to the third terminal;
- a fourth terminal connected to the fourth steering diode whereby current may flow from the terminal to the fourth terminal; said fourth terminal being connected to its associated telephone which is, in turn, connected to the other lead of said line pair and
- a fifth steering diode connected between the fourth and second terminals whereby current may flow between the fourth terminal to the second terminal.

* * * * *

UNITED STATES PATENT OFFICE
CERTIFICATE OF CORRECTION

Patent No. 4,332,983            Dated Jun. 1, 1982

Inventor(s) Hosein Vakili

It is certified that error appears in the above-identified patent and that said Letters Patent are hereby corrected as shown below:

On the Title Page, the Inventor's Address should read:

--      17330 Parkside Court
         Monte Sereno, CA 95030 --.

Signed and Sealed this

Third Day of August 1982

[SEAL]

*Attest:*

*Attesting Officer*

GERALD J. MOSSINGHOFF

*Commissioner of Patents and Trademarks*